(12) United States Patent
Ebrahimi Afrouzi

(10) Patent No.: US 12,544,625 B1
(45) Date of Patent: Feb. 10, 2026

(54) SMART GYM EQUIPMENT

(71) Applicant: Ali Ebrahimi Afrouzi, Henderson, NV (US)

(72) Inventor: Ali Ebrahimi Afrouzi, Henderson, NV (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 18/976,729

(22) Filed: Dec. 11, 2024

Related U.S. Application Data

(63) Continuation of application No. 18/781,093, filed on Jul. 23, 2024, which is a continuation of application No. 17/550,986, filed on Dec. 14, 2021, now Pat. No. 12,053,674, which is a continuation of application No. 16/372,471, filed on Apr. 2, 2019, now abandoned.

(60) Provisional application No. 62/656,803, filed on Apr. 12, 2018.

(51) Int. Cl.
*A63B 24/00* (2006.01)
*G06F 3/0482* (2013.01)
*G06N 3/08* (2023.01)
*G06N 20/00* (2019.01)

(52) U.S. Cl.
CPC ........ *A63B 24/0087* (2013.01); *G06F 3/0482* (2013.01); *G06N 3/08* (2013.01); *G06N 20/00* (2019.01)

(58) Field of Classification Search
CPC .... A63B 24/0087; G06F 3/0482; G06N 3/08; G06N 20/00
See application file for complete search history.

(56) References Cited

U.S. PATENT DOCUMENTS

| | | | | |
|---|---|---|---|---|
| 6,071,216 A | * | 6/2000 | Giannelli | A63B 21/4035 482/136 |
| 6,142,917 A | * | 11/2000 | Giannelli | A63B 23/1209 482/136 |
| 6,254,516 B1 | * | 7/2001 | Giannelli | A63B 23/1209 482/136 |
| 6,287,243 B1 | * | 9/2001 | Isom | A63B 21/4029 482/130 |
| 7,364,535 B1 | * | 4/2008 | Rosenow | A63B 21/4033 482/142 |
| 7,473,211 B2 | * | 1/2009 | Lee | A63B 21/063 482/97 |
| D612,437 S | * | 3/2010 | Fenster | D21/675 |
| D613,350 S | * | 4/2010 | Fenster | D21/675 |

(Continued)

FOREIGN PATENT DOCUMENTS

| | | |
|---|---|---|
| AU | 2009100694 A4 | 8/2009 |
| CN | 101791466 B | 2/2013 |

(Continued)

*Primary Examiner* — Garrett K Atkinson

(57) ABSTRACT

Provided is a method, including: creating, with a magnetic field, continuous amounts of resistance in a smart gym equipment, wherein an electrical current flows through wires in the smart gym equipment to create the magnetic field; adjusting, with one or more processors, the electrical current flow to increase or decrease strength of the magnetic field, wherein: the one or more processors determine a value for an electrical current based on at least one of sensed data, and a user's selection received from an application of a communication device or a user interface of the smart gym equipment.

30 Claims, 4 Drawing Sheets

(56) References Cited

U.S. PATENT DOCUMENTS

| | | | | |
|---|---|---|---|---|
| 7,717,836 | B1* | 5/2010 | Miller | A63B 21/00 |
| | | | | 482/142 |
| 7,753,830 | B1* | 7/2010 | Marsh | A63B 23/03525 |
| | | | | 482/142 |
| 9,610,476 | B1* | 4/2017 | Tran | A63F 11/00 |
| 9,849,364 | B2* | 12/2017 | Tran | G16H 40/63 |
| 10,022,614 | B1* | 7/2018 | Tran | G16H 50/20 |
| 10,883,844 | B2* | 1/2021 | Ogale | G06N 3/08 |
| 11,199,853 | B1* | 12/2021 | Afrouzi | B25J 13/006 |
| 11,876,464 | B2* | 1/2024 | Li | H02P 21/22 |
| 2003/0092543 | A1* | 5/2003 | Giannelli | A63B 21/4035 |
| | | | | 482/99 |
| 2005/0032614 | A1* | 2/2005 | Keiser | A63B 21/4029 |
| | | | | 482/142 |
| 2006/0058156 | A1* | 3/2006 | Cohen | A63B 24/00 |
| | | | | 482/4 |
| 2008/0176713 | A1* | 7/2008 | Olivera Brizzio | A63B 24/00 |
| | | | | 482/8 |
| 2009/0075791 | A1* | 3/2009 | Kissel | A63B 21/155 |
| | | | | 482/93 |
| 2011/0256983 | A1* | 10/2011 | Malack | A63B 21/4015 |
| | | | | 482/4 |
| 2015/0148203 | A1* | 5/2015 | Rios Sodeyama | A63B 21/00076 |
| | | | | 482/112 |
| 2017/0232300 | A1* | 8/2017 | Tran | G06F 1/163 |
| | | | | 434/247 |
| 2018/0200605 | A1* | 7/2018 | Syed | A63B 69/3605 |
| 2019/0033085 | A1* | 1/2019 | Ogale | G01C 21/3446 |
| 2019/0077007 | A1* | 3/2019 | Mallinson | A61B 5/1128 |
| 2020/0266743 | A1* | 8/2020 | Li | H02P 21/0014 |
| 2020/0375529 | A1* | 12/2020 | Kasuya | A61B 5/6828 |

FOREIGN PATENT DOCUMENTS

| | | |
|---|---|---|
| CN | 102451544 B | 8/2013 |
| CN | 103956174 A | 7/2014 |
| CN | 105931325 A | 9/2016 |
| CN | 106897783 A | 6/2017 |
| CN | 107583261 A | 1/2018 |
| CN | 107993700 A | 5/2018 |
| CN | 207420112 U | 5/2018 |
| CN | 207458369 U | 6/2018 |
| CN | 207924830 U | 9/2018 |
| CN | 108961859 A | 12/2018 |

* cited by examiner

SMART GYM EQUIPMENT

CROSS-REFERENCE TO RELATED APPLICATIONS

This application is a Continuation of U.S. patent application Ser. No. 18/781,093, filed Jul. 23, 2024, which is a Continuation of U.S. patent application Ser. No. 17/550,986, filed Dec. 14, 2021, which is a Continuation of U.S. patent application Ser. No. 16/372,471, filed Apr. 2, 2019, which claims the benefit of U.S. Provisional Patent Application No. 62/656,803, filed Apr. 12, 2018, each of which is hereby incorporated by reference.

FIELD OF THE DISCLOSURE

The disclosure relates to gym equipment.

BACKGROUND

The majority of gym equipment is manual. A person exercising is required to manually adjust the weight on an exercise machine or choose a specific free weight based on their weight-lifting abilities. At times this can be cumbersome, as estimating your own weight-lifting abilities and weight-lifting limits can be difficult. Furthermore, throughout an exercise routine, the weight lifting ability and weight lifting limit of a person can change due to, for example, increased tiredness with increased repetition. In other instances, a person may not be able to achieve their true weight lifting limit due to safety concerns the person may have (e.g., an absence of a spotter, injury).

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a method, including: creating, with a magnetic field, continuous amounts of resistance in a smart gym equipment, wherein an electrical current flows through wires in the smart gym equipment to create the magnetic field; adjusting, with one or more processors, the electrical current flow to increase or decrease strength of the magnetic field, wherein: the one or more processors determine a value for an electrical current based on at least one of sensed data, and a user's selection received from an application of a communication device or a user interface of the smart gym equipment.

DETAILED DESCRIPTION OF SOME EMBODIMENTS

Figure 1:
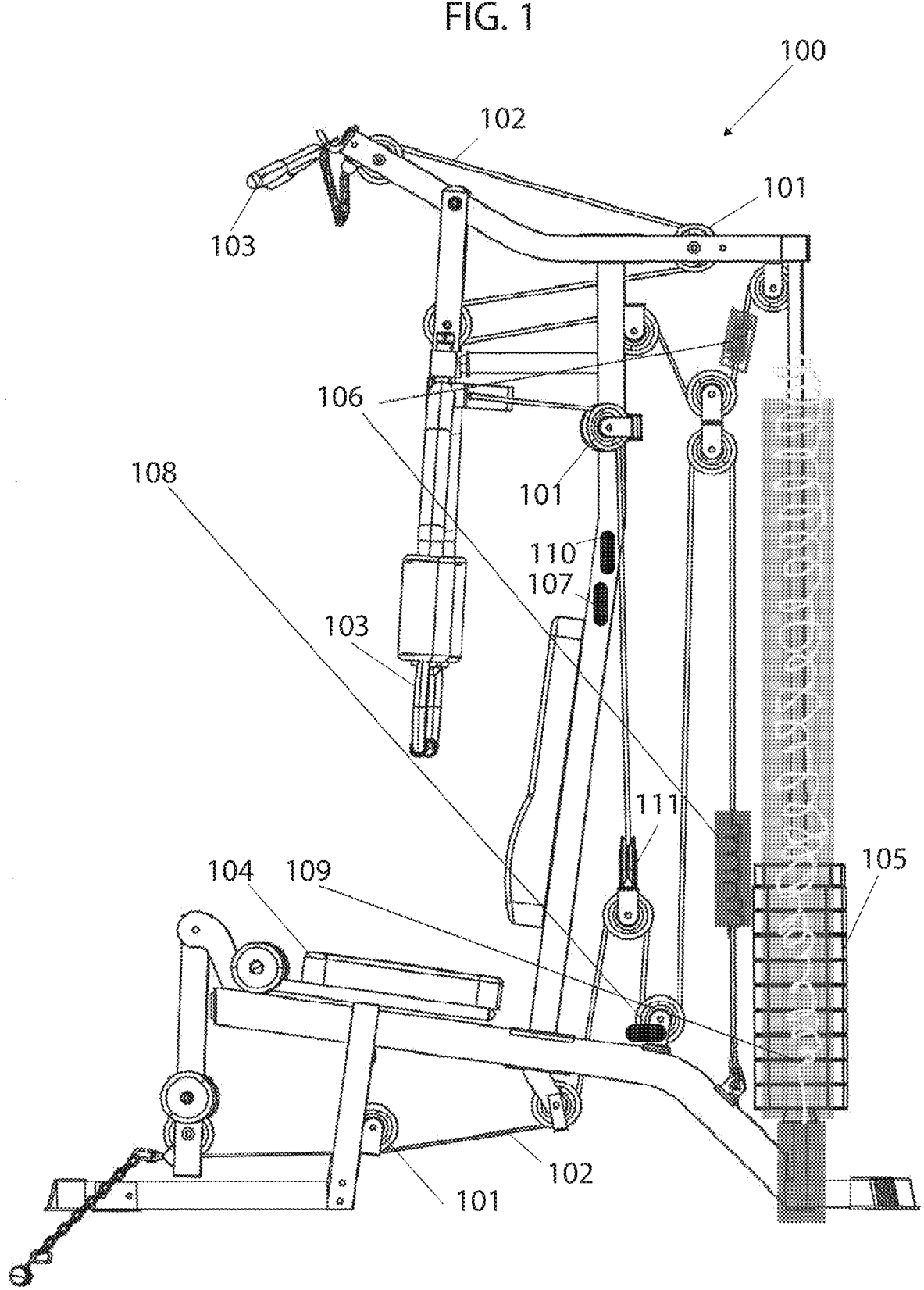
FIG. 1 illustrates an example of smart gym equipment, according to some embodiments.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well-known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

The present invention introduces a system for gym equipment that utilizes smart technology. In some embodiments, the equipment may utilize various sensor arrangements in order to transmit information to a processor. In some embodiments, various sensors can measure force, acceleration of strings or cables being utilized in the equipment which are connected to weights. In some embodiments, sensors can sense other information as well such as how far the weights have been moved. For instance, if a user is struggling and has only been able to pull a weight half the travel distance to the maximum distance, a sensor may sense this information, process the data and send it to the processor where it may be catalogued.

In some embodiments, the equipment will utilize the processor to process information regarding the user. The equipment may utilize magnets, electrical currents, and the like to facilitate the actions that the smart technology implements. In one embodiment, the magnets may create a magnetic field. The magnetic field can aid in lightening or increasing the heaviness of the weights. In some embodiments, an electrical current through a wire can adjust the weight, in such a way that a user can have continuous amounts of weight.

In some embodiments, the equipment may collect data every time a user utilizes the equipment. Such information may include what time the machine was used, what the date was, who the user was, what exercise the equipment was utilized for, what weight value was utilized, how long the equipment was utilized for when it was used, how far the user was able to pull at a certain weight value, and the like. Such information can be utilized with machine learning in order to make predictions and recommendations as to what workout routine may be conducted.

In some embodiments, the equipment may utilize a machine learning algorithm in order to predict what the user may need. In some embodiments, the device may utilize a machine learning algorithm with deep neural networks. Over a period of time, all user data may be collected, and the device may learn and make recommendations to users about what weight or exercise should be utilized as well as predict what a user may wish to partake in workout-wise. In some embodiments, the machine learning algorithm may assist in determining what a user's maximum weight efficiency is.

Every time a given user utilizes a certain weight value the machine learning algorithm may collect this data. Over time this compiled data may shed light on a user's routines, ability level, tendencies, and the like. The device may be able to assist a user with pushing themselves to their maximum degree in order to achieve a greater level of exercisability.

In some embodiments, the device may be paired with an application, having a touch screen, or some other interactivity, where a user can interact with the device. In such a situation, a user may be able to set selections for the device. For example, a user may be able to preset a certain weight value by pushing a button and then the device may utilize that certain weight value. For a device that is a multi-workout device, for example, a device that utilizes both back muscle group exercises as well as arm muscle group exercises, a user may be able to select which exercise they wish to partake in. Additionally, a device may ask a first-time user a set of questions such as age, weight, exercise history or ability, and the like, in order to render a recommendation to the user as to what weight class that user may utilize. A user may be able to reject or accept such a recommendation.

In some embodiments, a user may be able to select what workout routine they may take part in and the device may prepare itself ahead of time for each routine. For instance, a user may select a workout routine by doing an arm muscle group workout routine for the day. The user may select bicep curl, tricep curl, and another type of bicep curl each with three sets of 10 repetitions each. Once a user has reached the threshold of the repetition and number of sets for each the device may switch itself to the next workout routine for the user. Alternatively, the device may come with a preset list of workouts and the user may select what type of muscle group they wish to work out in. Once that selection is made, the device may let the user know what workout is to be conducted and for how many repetitions.

In some embodiments, the device may come with a training program in order to help a user know how to properly conduct a workout routine so as not to injure themselves. The device may be paired with an application or have a screen as well as speakers on the device itself which has videos on it to show how a user is to conduct a particular workout on the device being utilized.

In some embodiments, utilizing machine learning algorithms may use deep neural networks. In some embodiments, the device may observe how a human trainer or coach trains and assists users over many repetitions of training examples. Once the machine learns this information, it may be able to replicate these same patterns and train other users. In some embodiments, the device may make recommendations to a user based on data that has been collected. FIG. 1 depicts an example of smart gym equipment.

Some embodiments provide smart gym equipment including one or more sensors, actuators, pulleys, strings, handles, magnets, weights, and a processor. In some embodiments, the one or more sensors include force sensors, weight sensors, accelerometers, optical encoders, optical sensors, extensometers, and the like. For example, a person may lift a certain weight value by pulling on a handle attached to a first end of a cable. The cable may be arranged on a pulley and a weight may be attached to a second end of the cable. In this example, a weight sensor may measure the value of weight being lifted by the person or an optical encoder positioned on the pulley may measure the distance the individual was able to pull the weight. In some embodiments, the processor receives data from the one or more sensors and executes actions based on the data received. For example, if a distance the individual was able to pull a weight is only half the maximum distance, the processor may reduce the weight value being lifted by the person. In some embodiments, the smart gym equipment includes magnets that are used to increase or decrease the weight value being lifted by the person. In some embodiments, a weight is connected to a wire and the processor adjusts the amount of electrical current flowing through the wire to increase or decrease the strength of the magnetic field. For example, the processor may increase the magnetic field for a first weight value being lifted by the person to a second weight value to be pulled, and the second weight value back towards the first weight value and again increase the weight being lifted by the person.

In some embodiments, the processor stores sensor data collected by the one or more sensors in a memory. In some embodiments, other types of data are stored. In some embodiments, the processor stores data for one or more persons using the smart gym equipment and determines unique equipment settings for each person based on the sensor data received. In some embodiments, data stored for a person can include the person using the machine, age of the person, body weight of the person, and height of the person, exercise goals (e.g., duration of exercise, target body weight of the person, target weight-lifting value for a particular exercise, target number of repetitions for a particular exercise, etc.), time and date of use, exercises performed, weight values lifted for each exercise performed, duration of each exercise performed, the number of repetitions for each exercise performed, the level of completion of each repetition performed, maximum weight value lifted for each exercise performed, duration of a total exercise session, and the like. Equipment settings can include, for example, a particular exercise, a magnitude of weight value for a particular exercise, a duration for performing a particular exercise, number of repetitions for a particular exercise, change in the magnitude of weight value during a particular exercise and at which repetition the change in weight value is implemented, the order of exercises performed during an exercise session, total duration of an exercise session, the television channel or program to display on a screen, a height of a component of the smart gym equipment for a particular exercise, an angle of a component of the smart gym equipment for a particular exercise, a position of a component of the smart gym equipment for a particular exercise, and the like. Examples of components of the smart gym equipment can include a handle, a bench, a seat, a pulley, a strap, and the like.

In some embodiments, a person inputs data and chooses equipment settings using a user interface of the smart gym equipment (e.g., touchscreen), an application of a communication device (e.g., mobile device, tablet, laptop, desktop computer, etc.) paired with the processor of the smart gym equipment, or other devices with a user interface and capable of communicating with the processor of the smart gym equipment. For example, in some embodiments, a person may use the user interface to input their body weight, age, height, medical history, exercise goals, and the like upon their first use of the smart gym equipment. In another example, the person may use the user interface to choose the magnitude of a weight value for lifting for a particular exercise and the processor adjusts the smart gym equipment based on the weight value that is chosen by the person. In another example, the person uses the user interface to choose a particular exercise from a repertoire of different available exercises. In some embodiments, the processor prepares the machine for the particular exercise. In some embodiments, the person is presented with suggested exercises for an exercise session (e.g., based on exercise history, sensor data, fitness level, body weight, age, etc.) and uses the user input to accept or decline. In one example, the person chooses one or more exercises, the magnitude of weight values for lifting for each exercise, and the number of repetitions for each exercise using the user interface. In some embodiments, the processor adjusts the smart gym equipment for the next exercise after the number of repetitions for the current exercise has been reached. Adjustments to the smart gym equipment can include, for example, adjustment of pulleys, adjustment in magnitude of the weight values for lifting, adjustment of cables, adjustment of a bench or seat, adjustment of a handle attached to the cable, and the like. In one example, the person selects a particular muscle group using the user interface, and a selection of possible exercise routines for that muscle group including multiple exercises are presented to the person on the display screen of the user interface for the person to choose from. In some embodiments, the person watches a demonstration (e.g., a video including audio displayed on a user interface of the smart gym equipment, in which case the smart gym equipment may include speakers) of a particular exercise on the display screen of the user interface.

In some embodiments, the processor uses machine learning with neural networks to determine unique equipment settings for a person based on input data. In some embodiments, the processor uses deep neural networks to learn complex, non-linear functions. In some embodiments, the deep neural networks recognize patterns by clustering and classifying data. In some embodiments, the neural networks establish correlations between the input data. In some embodiments, the machine learning application is trained based on input data provided to determine the equipment settings of a person. In some embodiments, the training process includes a person manually choosing the equipment settings while the processor simultaneously receives input data from the one or more sensors of the smart gym equipment. In some embodiments, the processor learns a function that relates input data to the equipment settings for the particular person. In some embodiments, different input data are assigned different importance weights based on their importance in predicting the equipment settings. In some embodiments, during a weight-training session, the processor predicts the equipment settings using the currently learned function and compares the prediction to the actual equipment settings chosen by the person. In some embodiments, the processor determines a prediction error and backpropagates the error through the neural network, thereby adjusting the learned function. In some embodiments, the error is backpropagated by adjusting the importance weight assigned to different types of sensor input. In some embodiments, the processor uses tracking error gradient descent to reduce the error. In some embodiments, the training process for machine learning is performed for a predetermined amount of time, or until the success rate or error of the equipment settings predicted by the neural network is above or below a predetermined threshold, respectively.

In some embodiments, the person uses the user interface to rate one or more equipment settings predicted by the processor. In some embodiments, the processor adjusts the learned function based on the ratings received. In some embodiments, the processor suggests equipment settings to the person, and the person accepts or declines the suggested equipment settings using the user interface. In some embodiments, the processor adjusts the learned function based on the response to the suggestions provided to the person. In some embodiments, the processor adjusts the function by adjusting the importance weight assigned to different types of input data based on the ratings or responses to the suggestions provided to the person. In some embodiments, the processor adjusts the learned function each time the predicted equipment setting is adjusted by the person.

In some embodiments, the neural network implements a Markov Decision Process in learning the relationship between equipment settings and input data. In some embodiments, the processor assigns a reward each time positive feedback from a user is received. In some embodiments, the application assigns a penalty each time negative feedback from a user is received. Examples of feedback include a change or no change in equipment settings chosen by the processor, user ratings, user response to suggestions, etc. In some embodiments, different types of feedback or feedback for different equipment settings have different magnitudes of reward or penalty. In some embodiments, the processor minimizes a cost function or maximizes a reward function to optimize the function predicting equipment settings.

In some embodiments, the processor learns weight-training methods used by a coach or trainer of a person using the techniques described herein. In some embodiments, a person chooses a weight-training mode of the smart gym equipment and the processor chooses exercise routines according to the learned weight-training methods. In some embodiments, the processor learns the weight-training methods of particular coaches/trainers and the person chooses a particular coach/trainer (e.g., based on their weight-training methods). In some embodiments, the user interface displays pre-recorded or live-feed videos of the coach/trainer during exercise sessions. In some embodiments, the coach/trainer is financially compensated by the person when chosen. In some embodiments, the person compensates the coach/trainer using the user interface by making an electronic payment.

FIG. 1 illustrates an example of a smart gym equipment 100 with pulleys 101, cables 102, handles 103, seat 104, and weights 105. In some embodiments, smart gym equipment 100 includes springs 106 attached to cables 102. In some embodiments, an extensometer measures extension of springs 106 and a processor 107 of the smart gym equipment 100 determines a force based on at least the extension of the spring and spring stiffness. In some embodiments, smart gym equipment 100 includes an optical sensor 108 to measure acceleration of the cables during an exercise. In some embodiments, smart gym equipment 100 passes electricity 109 along a wire contacting weights 105. In some embodiments, the processor 107 adjusts the magnitude of electrical current 109 to adjust the magnetic field of weights 105 to reduce or increase the amount of weight lifted by a person. In some embodiments, the smart gym equipment 100 also includes memory 110 and actuator 111 that autonomously adjusts the position of the pulley it is attached to. FIG. 1 is merely an example of a smart gym equipment. Several configurations are possible. For example, in other configurations, actuators can be used to adjust position, angle, and height of any components of the smart gym equipment.

Figure 2:
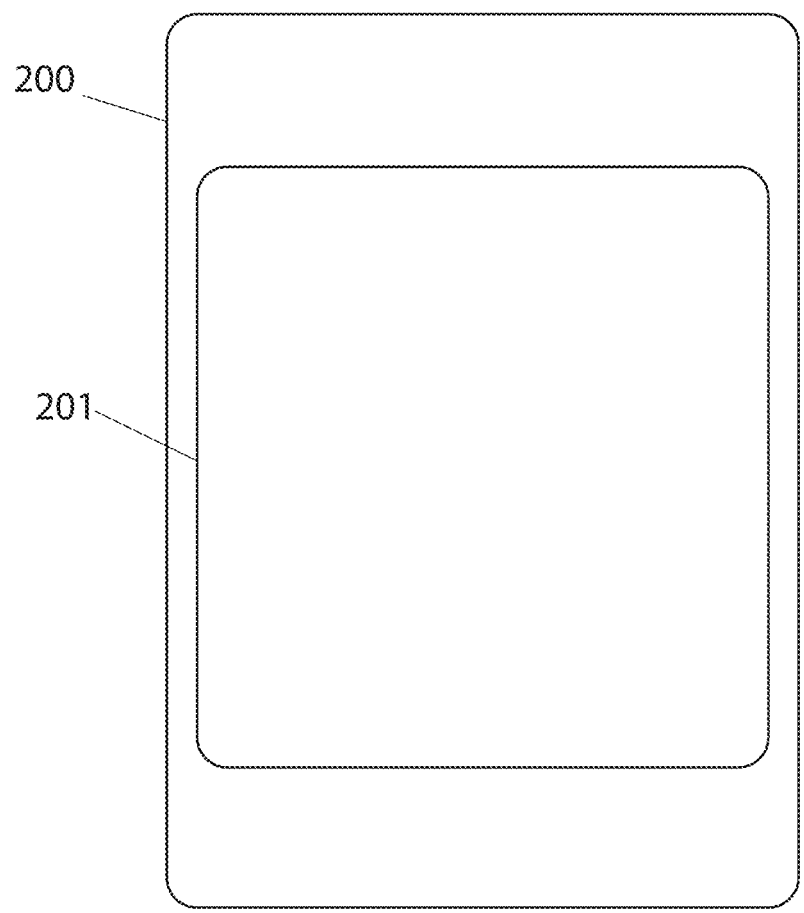
FIG. 2 illustrates an example of a communication device with user interface touchscreen that may be paired with the smart gym equipment, according to some embodiments

FIG. 2 illustrates an example of a communication device, mobile device 200 with user interface touchscreen 201. Mobile device 200 with touchscreen 201 may be used to execute an application paired with the smart gym equipment. A person may provide input to the application (e.g., magnitude of weight value, particular exercise, age, body weight, exercise goals, etc.) using the touchscreen and the application may transmit the input data to the processor of the smart gym equipment. The processor of the smart gym equipment may autonomously adjust equipment settings based on the input data received.

Figure 3:
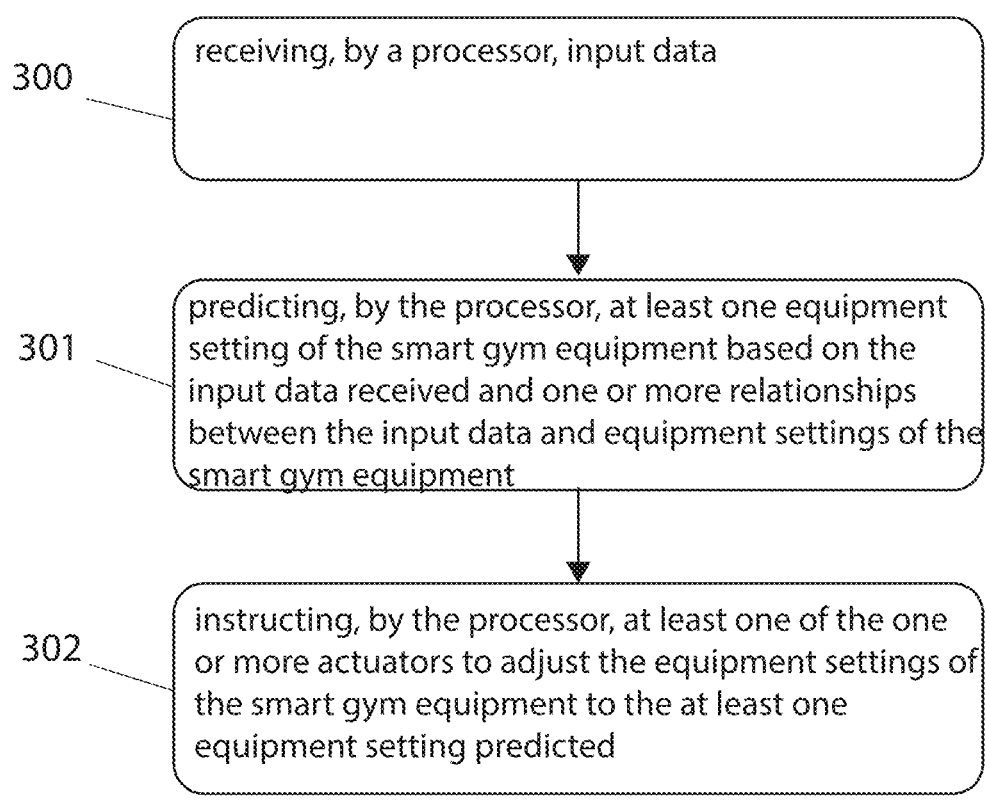
FIG. 3 illustrates a flowchart describing an example of a method for autonomously adjusting equipment settings of a smart gym equipment for a particular person, according to some embodiments.

FIG. 3 illustrates a flowchart describing an example of a method for autonomously adjusting equipment settings of a smart gym equipment for a particular person, including steps 300, 301, and 302.

Figure 4:
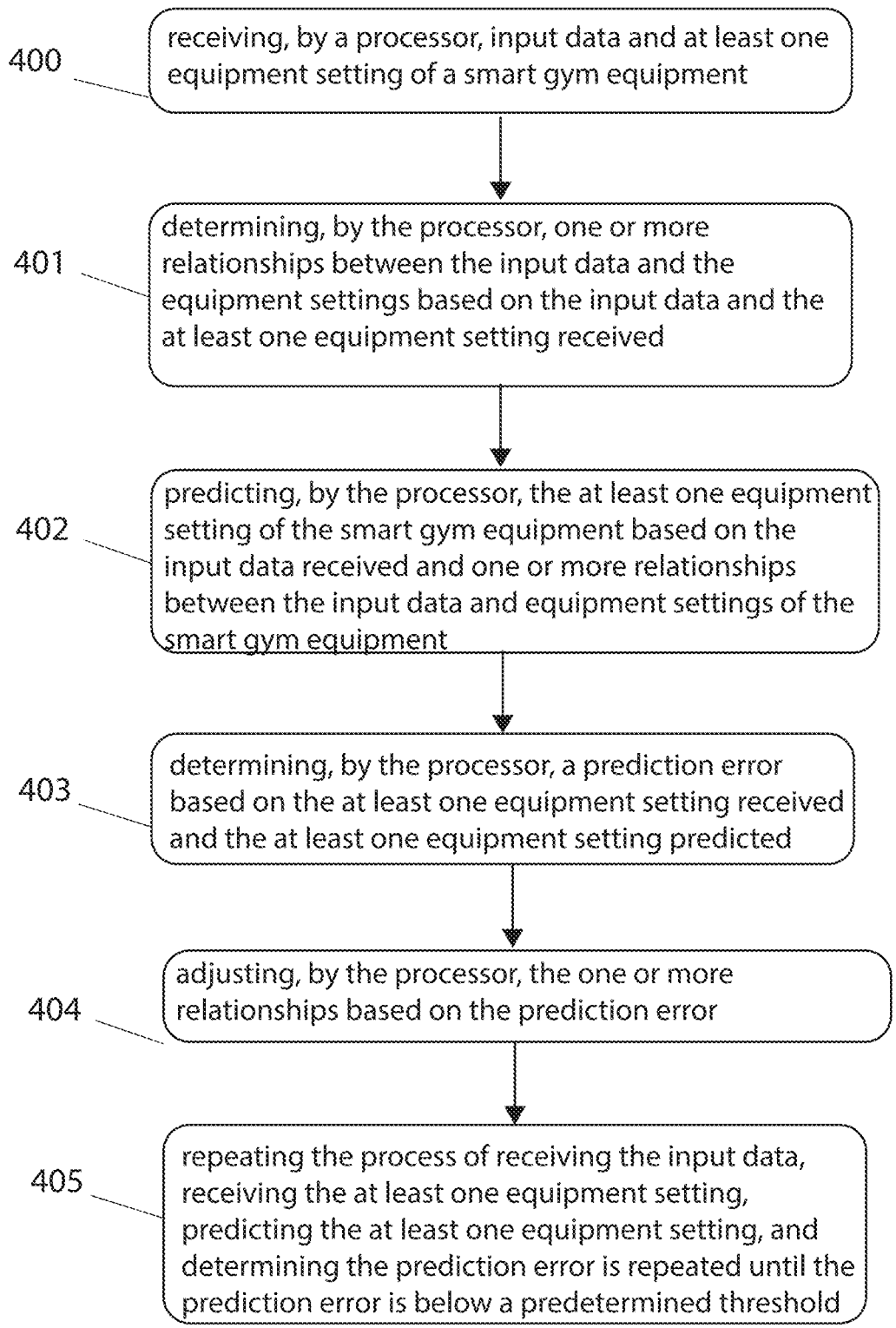
FIG. 4 illustrates a flowchart describing an example of a method for learning one or more relationships between input data and equipment settings of a smart gym equipment, according to some embodiments.

FIG. 4 illustrates a flowchart describing an example of a method for learning one or more relationships between input data and equipment settings of a smart gym equipment, including steps 400, 401, 402, 403, 404, and 405.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine-readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A smart gym equipment, comprising: one or more sensors, actuators, weights, and a processor; and, a tangible, non-transitory, machine-readable medium storing instructions that when executed by the processor effectuates operations comprising: receiving, by the processor, input data; predicting, by the processor, at least one equipment setting of the smart gym equipment based on the input data received and one or more relationships between the input data and equipment settings of the smart gym equipment; and, instructing, by the processor, at least one of the one or more actuators to adjust the equipment settings of the smart gym equipment to the at least one equipment setting predicted.
2. The smart gym equipment of embodiment 1, wherein the equipment settings comprise at least one of: a particular exercise, a magnitude of a weight value for a particular exercise, a duration for performing a particular exercise, number of repetitions for a particular exercise, change in the magnitude of a weight value during a particular exercise and at which repetition the value change is implemented, the order of exercises performed during an exercise session, a height of a component of the smart gym equipment for a particular exercise, an angle of a component of the smart gym equipment for a particular exercise, a position of a component of the smart gym equipment for a particular exercise, total duration of an exercise session, and the television channel or program to display on a screen.
3. The smart gym equipment of embodiments 1-2, wherein the input data comprises at least one of: data captured by the one or more sensors, user data, equipment settings, and user feedback.
4. The smart gym equipment of embodiment 3, wherein the user data comprises at least one of: the name of the user, age of the user, body weight of the user, height of the user, preferred duration of exercise, preferred exercises, exercise schedule, target body weight of the user, target lifting-weight value for a particular exercise, target number of repetitions for a particular exercise, target duration for a particular exercise, times and dates of exercise sessions, exercises performed, weight values lifted for each exercise performed, duration of each exercise performed, the number of repetitions for each exercise performed, the level of completion of each repetition performed, maximum weight value lifted for each exercise performed, total duration of exercise sessions, a preferred height of a component of the smart gym equipment for a particular exercise, a preferred angle of a component of the smart gym equipment for a particular exercise, a preferred position of a component of the smart gym equipment for a particular exercise.
5. The smart gym equipment of embodiment 3, wherein a graphical user interface of a communication device paired with the smart gym equipment or of the smart gym equipment is used to input at least one of: the user data, the equipment settings, and the user feedback.
6. The smart gym equipment of embodiments 1-5, wherein the one or more sensors comprises at least one of: a force sensor, an optical encoder, an accelerometer, a weight sensor, an electrical current sensor, an imaging sensor, a depth sensor, a gyroscope, an odometer, an optical sensor, an extensometer, a speedometer, a timer, and a repetition counter.
7. The smart gym equipment of embodiments 1-6, wherein the operations further comprise operations to learn the one or more relationships between the input data and the equipment settings prior to the processor being able to autonomously adjust the equipment settings to those predicted.
8. The smart gym equipment of embodiment 7, wherein the operations to learn the one or more relationships between the input data and the equipment settings comprise: receiving, by the processor, the input data; receiving, by the processor, at least one equipment setting of the smart gym equipment; determining, by the processor, one or more relationships between the input data and the equipment settings based on the input data and the at least one equipment setting received; predicting, by the processor, the at least one equipment setting of the smart gym equipment based on the input data received and the one or more relationships; determining, by the processor, a prediction error based on the at least one equipment setting received and the at least one equipment setting predicted; and, adjusting, by the processor, the one or more relationships based on the prediction error, wherein the process of receiving the input data, receiving the at least one equipment setting, predicting the at least one equipment setting, and determining the prediction error is repeated until the prediction error is below a predetermined threshold.
9. The smart gym equipment of embodiment 8, wherein the at least one equipment setting received by the processor is selected by the user using the graphical user interface of the communication device or of the smart gym equipment, and wherein the processor instructs at least one of the one or more actuators to adjust the equipment settings of the smart gym equipment to the at least one equipment setting received.

10. The smart gym equipment of embodiment 8, wherein the user manually adjusts the equipment settings of the smart gym equipment to the at least one equipment setting, and wherein the at least one equipment setting received by the processor is determined based on data captured by the one or more sensors.

11. The smart gym equipment of embodiments 1-10, wherein the operations further comprise: receiving, by the processor, at least one equipment setting of the smart gym equipment; determining, by the processor, a prediction error based on the at least one equipment setting received and the at least one equipment setting predicted; and, adjusting, by the processor, the one or more relationships based on the prediction error.

12. The smart gym equipment of embodiments 1-11, further comprising: adjusting, by the processor, the one or more relationships based on at least a portion of the input data received.

13. The smart gym equipment of embodiments 1-12, wherein the processor determines the one or more relationships using one or more neural networks.

14. The smart gym equipment of embodiment 13, wherein the one or more neural networks comprise a Markov Decision Process.

15. A method, comprising: receiving, by a processor, input data; predicting, by the processor, at least one equipment setting of a smart gym equipment based on the input data received and one or more relationships between the input data and equipment settings of the smart gym equipment; and, instructing, by the processor, at least one actuator of the smart gym equipment to adjust the equipment settings of the smart gym equipment to the at least one equipment setting predicted.

16. The method of embodiment 15, wherein the equipment settings comprise at least one of: a particular exercise, a magnitude of weight value for a particular exercise, a duration for performing a particular exercise, number of repetitions for a particular exercise, change in the magnitude of weight value during a particular exercise and at which repetition the value change is implemented, the order of exercises performed during an exercise session, a height of a component of the smart gym equipment for a particular exercise, an angle of a component of the smart gym equipment for a particular exercise, a position of a component of the smart gym equipment for a particular exercise, total duration of an exercise session, and a television channel or program to display on a screen.

17. The method of embodiments 15-16, wherein the input data comprises at least one of: data captured by the one or more sensors, user data, equipment settings, and user feedback.

18. The method of embodiment 17, wherein the user data comprises at least one of: the name of the user, age of the user, weight of the user, height of the user, preferred duration of exercise, preferred exercises, exercise schedule, target weight of the user, target lifting weight for a particular exercise, target number of repetitions for a particular exercise, target duration for a particular exercise, times and dates of exercise sessions, exercises performed, weight lifted for each exercise performed, duration of each exercise performed, the number of repetitions for each exercise performed, the level of completion of each repetition performed, maximum weight lifted for each exercise performed, total duration of exercise sessions, a preferred height of a component of the smart gym equipment for a particular exercise, a preferred angle of a component of the smart gym equipment for a particular exercise, a preferred position of a component of the smart gym equipment for a particular exercise.

19. The method of embodiments 15-18, further comprising learning the one or more relationships between the input data and the equipment settings prior to the processor being able to autonomously adjust the equipment settings to those predicted, wherein learning the one or more relationships comprises: receiving, by the processor, the input data; receiving, by the processor, at least one equipment setting of the smart gym equipment; determining, by the processor, one or more relationships between the input data and the equipment settings based on the input data and the at least one equipment setting received; predicting, by the processor, the at least one equipment setting of the smart gym equipment based on the input data received and the one or more relationships; determining, by the processor, a prediction error based on the at least one equipment setting received and the at least one equipment setting predicted; and, adjusting, by the processor, the one or more relationships based on the prediction error, wherein the process of receiving the input data, receiving the at least one equipment setting, predicting the at least one equipment setting, and determining the prediction error is repeated until the prediction error is below a predetermined threshold.

20. The method of embodiments 15-19, further comprising: receiving, by the processor, at least one equipment setting of the smart gym equipment; determining, by the processor, a prediction error based on the at least one equipment setting received and the at least one equipment setting predicted; and, adjusting, by the processor, the one or more relationships based on the prediction error.

The invention claimed is:

1. A method, comprising:

creating, with a magnetic field, continuous amounts of resistance in a smart gym equipment, wherein an electrical current flows through wires in the smart gym equipment to create the magnetic field;

adjusting, with one or more processors of the smart gym equipment, the electrical current flow to increase or decrease a strength of the magnetic field; and instructing, with the one or more processors of the smart gym equipment, at least one actuator to automatically implement a value of at least one electrical current, wherein:

the one or more processors of the smart gym equipment determine the value for at least one electrical current based on at least one of sensed data, a user's selection received from an application of a communication device or a user interface of the smart gym equipment, and at least one relationship determined based on a plurality of previous input data and corresponding previous values of the at least one electrical current.

2. The method of claim 1, further comprising:

determining, with the one or more processors of the smart gym equipment, a value for the electrical current based on training methods of a trainer chosen by the user.

3. The method of claim 2, wherein the training methods of the selected trainer is learned with neural networks and a backpropagation process.

4. The method of claim 2, wherein the magnitude of increase or decrease of the magnetic field is based on training methods of the trainer chosen by the user.

5. The method of claim 4, wherein the method used by the user's human trainer is learned, with the one or more processors of the smart gym equipment, through backpropagation.

6. The method of claim 2, wherein the user interface of the device or the application of the communication device displays pre-recorded or live-feed videos of the chosen trainer during exercise sessions.

7. The method of claim 1, wherein the strength of the magnetic field is determined based on machine learning or neural networks.

8. The method of claim 7, wherein a neural network utilizes a cost function.

9. The method of claim 1, further comprising:
autonomously increasing or decreasing, with the one or more processors of the smart gym equipment, the strength of the magnetic field in a subsequent session based on a performance of the user in an exercise session.

10. The method of claim 9, further comprising:
receiving, with the one or more processors of the smart gym equipment, a rating for each session from the user; and
adjusting, with the one or more processors of the smart gym equipment, the subsequent sessions based on the ratings from the user.

11. The method of claim 1, wherein the smart gym equipment further comprises at least one sensor.

12. The method of claim 11, wherein the at least one sensor measures force.

13. The method of claim 11, wherein the at least one sensor comprises at least one of: a force sensor, an optical encoder, an accelerometer, a weight sensor, an electrical current sensor, an imaging sensor, a depth sensor, a gyroscope, an odometer, an optical sensor, an extensometer, a speedometer, a timer, and a repetition counter.

14. The method of claim 1, wherein the one or more processors of the smart gym equipment read the electrical current.

15. The method of claim 1, wherein the magnetic field creates continuous amounts of resistance or stiffness.

16. The method of claim 1, wherein the smart gym equipment further comprises a pulley.

17. The method of claim 1, wherein the one or more processors of the smart gym equipment make a suggestion, and the user accepts or declines the suggestion.

18. The method of claim 1, wherein the user utilizes the user interface of the smart gym equipment or the application of the communication device to make a selection for a magnitude of a weight for an exercise session, wherein the one or more processors of the smart gym equipment adjust the weight based on the user's selection.

19. The method of claim 1, wherein the one or more processors of the smart gym equipment store the sensed data collected by at least the sensor in a memory.

20. The method of claim 19, wherein the one or more processors of the smart gym equipment store data for the user and adjust at least one equipment setting for each user based on the sensor data received.

21. The method of claim 20, wherein:
a value of at least one equipment setting received is received from the application of the communication device or the user interface of the smart gym equipment; and
the method further comprises:
instructing, with the one or more processors of the smart gym equipment, the at least one actuator to implement the value of at least one equipment setting received.

22. The method of claim 1, wherein at least one actuator adjusts a height, a position, and an angle of a component of the smart gym equipment.

23. The method of claim 1, wherein the user selects a duration for performing an exercise, a number of repetitions for an exercise, and a change in the magnitude of the weight during an exercise.

24. The method of claim 1, wherein the user selects one of: an order of exercises performed during an exercise session, a height of a component of the smart gym equipment for a particular exercise, an angle of a component of the smart gym equipment for a particular exercise, a position of a component of the smart gym equipment for a particular exercise, a total duration of an exercise session, and a television channel or program to display on a screen of the smart gym equipment.

25. The method of claim 1, wherein the at least one of: a name of the user, an age of the user, a weight of the user, a height of the user, a preferred duration of exercise, preferred exercises, an exercise schedule, a target weight of the user, a target lifting weight for a particular exercise, a target number of repetitions for a particular exercise, a target duration for a particular exercise, previous exercises performed, weights lifted for previous exercises performed, duration of previous exercises performed, a number of repetitions for previous exercises performed, a level of completion of previous repetitions performed, a maximum weight lifted for previous exercises performed, a total duration of exercise sessions, is received from the application of the communication device or the user interface of the smart gym equipment.

26. The method of claim 1, wherein the one or more processors of the smart gym equipment determine a suggested exercise unique to the user based on at least one of: an exercise history, sensor data history, a fitness level, a weight, and an age of the particular user.

27. The method of claim 1, wherein the one or more processors of the smart gym equipment determine suggested equipment settings for the user based on at least one of: an exercise history, sensor data history, a fitness level, a weight, and an age of the particular user.

28. The method of claim 1, wherein the application of the communication device is paired with the smart gym equipment.

29. The method of claim 28, wherein the application of the communication device paired with the smart gym equipment or the user interface of the smart gym equipment is configured to:
receive at least one input designating a particular muscle group; and
display a selection of possible exercise routines for the particular muscle group selected.

30. The method of claim 1, wherein one of: a preferred height of a component of the smart gym equipment for a particular exercise, a preferred angle of a component of the smart gym equipment for a particular exercise, and a preferred position of a component of the smart gym equipment for a particular exercise is received from the user.

* * * * *